Sept. 22, 1942.   C. E. WEHE   2,296,622
TIRE INFLATOR VALVE MECHANISM
Filed April 22, 1941
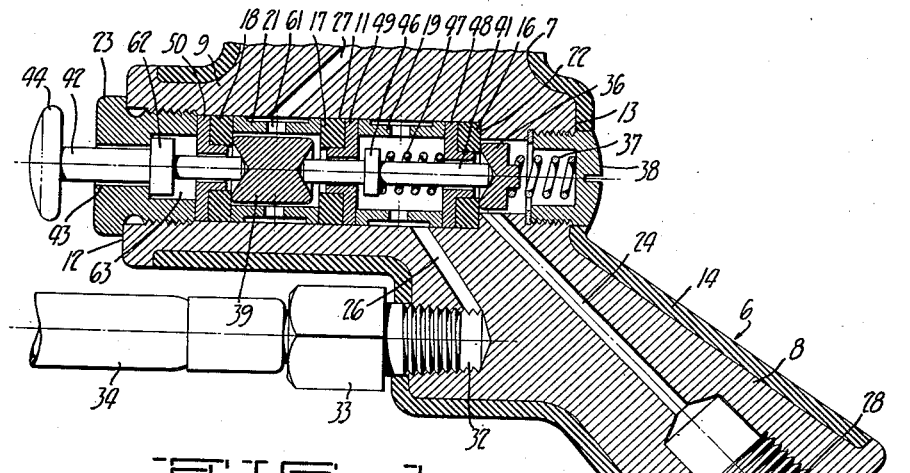
FIG_1_
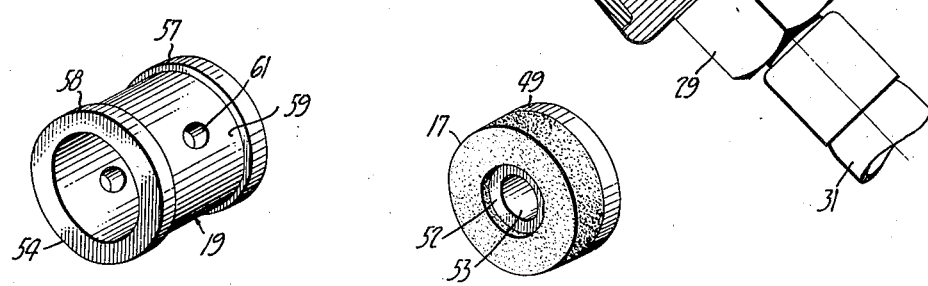
FIG_2_   FIG_3_
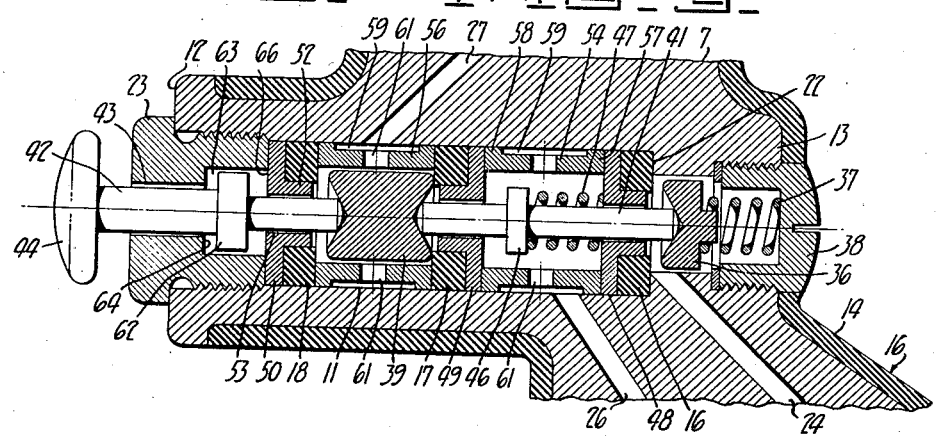
FIG_4_
INVENTOR
Carl E. Wehe
BY Joseph B. Gardner
his ATTORNEY Patented Sept. 22, 1942

2,296,622

UNITED STATES PATENT OFFICE 2,296,622

TIRE INFLATOR VALVE MECHANISM

Carl E. Wehe, Oakland, Calif.

Application April 22, 1941, Serial No. 389,732

8 Claims. (Cl. 137—695)

The invention relates to air inflator mechanisms for tires and the like and more particularly to the valve construction and assembly of such mechanisms.

The valve mechanism of a tire inflator device of the character described is customarily adapted for manual operation and to provide the selective connection of a source of air under pressure to a tire or the like to be inflated and for the connection of a gauge mechanism to the tire for determination of the air pressure contained within the tire, and for the venting of the gauge mechanism to release the pressure stored therein during its connection to the tire or other article being inflated. An object of the present invention is to provide a multi-positionable valve mechanism of the character described affording the various operative connections aforesaid which may be constructed of a plurality of similarly formed parts which may be readily assembled by successive insertion into a valve chamber and clamped in place, and wherein the identity of construction of various of the assembled parts permits interchangeability of position of these parts and substantially simplifies the manufacture of the valve parts in the assembly of the valve mechanism.

Another object of the invention is to provide a valve mechanism as defined above which upon manual operation to connect the pressure source to a tire or the like to be inflated, will momentarily connect the source to the gauge to cause a kicking of the gauge mechanism with high pressure air to free up the gauge mechanism, which normally tends to stick or jam in starting position after periods of non-use, whereby the gauge mechanism will operate properly when subsequently connected to the tire or the like.

The invention possesses other objects and features of advantages, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a longitudinal cross-sectional view of an air inflator body showing the valve mechanism of the present invention in cross-section.

Figure 2 is a perspective view of one of the sleeve members used in the valve assembly.

Figure 3 is a perspective view of one of the valve washers and supporting members therefor used in the valve assembly.

Figure 4 is a longitudinal sectional view similar to Figure 1 but on an enlarged scale showing the valve mechanism with the several parts thereof moved from their position illustrated in Figure 1.

A tire inflator mechanism to which the present invention relates customarily consists of a body in which are incorporated a gauge mechanism and a multi-way valve mechanism and a plurality of passages adapted for connection externally, by way of flexible conduits, to a source of air under pressure and to a tire or other object to be inflated, and which are connected internally to the gauge and valve mechanisms, the latter being operative in the several positions thereof to connect the air source to the tire and to connect the tire to the gauge mechanism.

The air inflator mechanism depicted in the accompanying drawing comprises a body 6 which as aforementioned is adapted to house the gauge and valve mechanisms, but since the present invention involves only the construction of the valve mechanism, that part of the body 6 in which the gauge mechanism is incorporated is deleted, as indicated by the break line 7 at the top of the body, as shown in Figure 1. The body 6 is preferably formed to provide a pistol grip and to this end is fashioned with a butt handle 8 which extends downwardly and transversely from a horizontal barrel part 9. Formed in this latter part of the body is an elongated cylindrical valve chamber 11 which opens to the side 12 of the body part 9 at the opposite side thereof from the handle 8, and which is hereinafter referred to as the outer end of the valve chamber, and preferably the chamber 11 extends completely through the body part 9 to open to the opposite side 13 thereof, which side is hereinafter denoted as the inner end of the chamber. Preferably the body is encased in a protective covering 14 of compressible material such as rubber or the like.

A plurality of valve washers 16, 17 and 18 are mounted in the chamber 11 in longitudinally spaced position and rigidly supported against an endwise displacement in the chamber by spacer means 19 and 21 positioned between the valve washers. The innermost washer 16 is supported at the inner face thereof against an internal shoulder 22 formed in the chamber and the entire assembly of washers and spacer means is clamped in position by closure means 23, here consisting of a plug threaded into the outer end of the chamber.

The body is here formed with a plurality of air passages 24, 26 and 27 which are operatively connected to the valve mechanism and to the source of air under pressure and the tire or other object to be inflated and the gauge mechanism. The passage 24 is here connected to the chamber 11 at the shoulder 22 behind the washer 16 and extends longitudinally through the handle 8 to a receiving socket 28 in the end portion of the handle, which socket is adapted for receipt of a fitting 29 for connection to a flexible conduit 31 leading to a source of air pressure. The passage 26 is connected to the valve chamber inwardly of the passage 24 and between the washers 16 and 17 and extends to a receiving socket 32 opening to a side of the body for receipt of a fitting 33 for a flexible conduit 34 leading to the tire or other object to be inflated. The passage 27 is connected to the chamber inwardly of the passage 26 and between the washers 17 and 18 and extends upwardly through the body, as indicated in Figures 1 and 4, to the gauge mechanism, not shown.

A valve member 36 is mounted for reciprocation at the inner end of the chamber 11 behind the washer 16 for movement to and from a seated position on the washer and is urged to such seated position by means of a helical spring 37 compressed between the valve 36 and a plug 38 threaded into the rear end of the chamber. Mounted for reciprocation in the portion of the chamber defined between the washers 17 and 18 is a double faced valve member 39 which is adapted to engage and seat at its opposite longitudinal ends on the washers 17 and 18 upon appropriate longitudinal displacement of the valve member. Connection means is provided between the valve members 36 and 39 to obtain a joint movement of these members and as here shown, this means consists of a stem member 41 extending centrally and longitudinally between the valve members. The manual operating means for the valve mechanism is provided adjacent the outer end of the chamber and as here shown, this means consists of a stem member 42 reciprocally carried in a center longitudinal opening 43 through the plug 23 and engaging at its inner end against the forward face of valve member 39, whereby upon inward movement of the stem, the valve members 39 and 41 will be moved to the right, as viewed in the present drawing, to unseat valve member 39 from washer 18 and to seat this valve member against washer 17 and at the same time unseat valve member 36 from the washer 16. This displaced position of the valves is illustrated in Figure 4. Preferably the stem 42 is provided with a manually engageable head 44 at the outer end thereof for convenient engagement and displacement by the fingers of the operator, it being noted in this connection that the stem is displaced towards the butt handle 8 for most convenient operation by the index finger of a hand gripping the handle 8. Upon release of pressure on the button or head 44 of the stem, the valves will return to their seated positions, as shown in Figure 1, by reason of the resilient action of spring 37, and to assist this return movement I prefer to resiliently motivate the stem member 41 to the left, as viewed in the drawing. For this purpose an enlargement 46 is provided on the stem member 41 against which is compressed a helical spring 47 supported at its opposite end on a supporting disc 48 for the washer 16.

As an important feature of the present construction, the washers 16, 17 and 18 are of identical construction and are preferably of standard shape and form readily obtainable. In addition the scaper units supporting the washers 16, 17 and 18 against relative endwise movement are similarly constructed of a series of identical parts permitting complete inter-changeability of these spacer parts. As will be seen in Figures 1 and 4, each of the washers 16, 17 and 18 are supported on one side thereof by supporting discs 48, 49 and 50, a perspective view of the disc and washer combination being illustrated in Figure 3. The discs 48—50 are in each instance of substantially the same diameter as the washers and are formed with tubular hub portions 52 which engage in and support the walls of the central opening 53 through the washers. In the case of washer and disc 16 and 48, the washer 16 is arranged to directly abut the shoulder 22 as aforesaid and is supported at its outer face by the disc 48. The next adjacent disc and washer 49 and 17 is arranged in a reverse fashion, that is with the disc innermost and the washer on the outside of the disc, and the outermost disc and washer 50 and 18 are arranged in reverse fashion to the last mentioned disc and washer combination, that is with the washer innermost and the disc 50 on the outside. Mounted between the discs 48 and 49, and between the washers 17 and 18 are sleeve members 54 and 56 which are of identical construction and each formed with annular end shoulders 57 and 58 which engage the wall of the chamber 11 and define with such wall an annular recess 59 extending around the central portion of the length of the sleeves. In addition each of the sleeves is provided with circumferentially spaced openings or perforations 61 which communicate the recess 59 with the interior of the sleeve, the aforementioned body passages 26 and 27 being positioned to register with the recesses 59. As will be understood, by reason of the identical construction of the sleeves 54 and 56, these members are interchangeable and accordingly there is no problem in the order of insertion of the members into the chamber in the assembly of the valve mechanism. The foregoing identity of construction of the washers and the discs and the sleeves, reduces the number of different parts which need be manufactured for the present valve mechanism, and greatly facilitates the assembly of the gauge mechanism. In this latter regard it will be clear from the foregoing and from the drawings that all of the parts aforesaid may be conveniently assembled by merely inserting the same longitudinally into the valve chamber through the ends of the chamber in proper successive relation. In addition to their function of supporting the washers 16—18, the discs 48—50 serve by way of the tubular hub portions 52 thereof to support the stem members 41 and 42, the openings through the hub portions 52 being in each instance somewhat larger in diameter than the stem members so as to afford passage of air therebetween.

Preferably, means is provided for limiting the longitudinal reciprocation of the manually operated stem 42 and as here shown, the latter is formed with an enlargement 62 which is mounted in a recess 63 formed in the plug 23 and is limited in its longitudinal movement by the base side 64 of the recess and the outer face 66 of the disc 50.

It will now be clear from the foregoing that in the normal position of the movable parts, as illustrated in Figure 1, the valve 36 is seated against washer 16 and accordingly the supply of air under pressure is cut off. As the stem member 42 is moved inwardly, to the right as viewed in Figures 1 and 2, there is a solid longitudinal connection between the stem members 41 and 42 furnished by the double faced valve 39, thereby causing an unseating of valve 36 and a passage of air under pressure into the interior of sleeve member 54 for passage through perforations 61 and recess 59 into the passage 26 for delivery to the tire. In accordance with the present construction, the valve 36 is unseated before the valve member 39 moves to a seated position against washer 17. Thus there is an instant during the movement of the parts when air may pass from the interior of sleeve 54 through the center opening in the disc 49, around valve 39 and into the passage 27 leading to the gauge mechanism. This feature in the operation is extremely desirable in order to loosen up the gauge mechanism for proper operation when subsequently connected to the tire. It is quite frequent that the plunger or piston commonly used in gauge mechanisms of this type will stick or freeze or jam in their starting position when not operated for a period of time, and therefore will not respond properly to the relatively low pressure supplied by a tire. In accordance with the present construction a spurt of high pressure air is passed to the gauge mechanism as aforementioned so as to kick the piston or plunger away from its starting position and to free up the parts which might be sticking, whereby when the gauge is subsequently connected to the tire, the piston will properly respond. Upon completion of the inward movement of stem 42, valve 39 seats against washer 17 and prevents high pressure air from reaching the gauge and at the same time any air pressure trapped in the gauge mechanism is vented back through passage 27, around valve 39 and out through the center openings in the disc 50 and plug 23.

I claim:

1. A valve assembly for a tire inflator mechanism comprising, a body having a cylindrical valve chamber opening to a side thereof, a plurality of valve washers mounted in longitudinally spaced position in said chamber, spacer means mounted between and supporting said valve washers, closure means for said chamber at the outer end thereof holding the assembly of washers and spacer means in position, said body being formed with a passage adapted for connection to a source of air under pressure and connected to said chamber inwardly of the innermost washer, said body being provided with a second passage adapted for connection to a tire or the like to be inflated and connected to said chamber between the innermost and next outer washer, said body being provided with a passage adapted for connection to a gauge and connected to said chamber between said second washer and the outermost washer, a valve mounted for reciprocation in said chamber inwardly of said first washer, resilient means normally urging said valve to a seated position on said first washer, a double faced valve member mounted for reciprocation between said second and third washers, means connecting said valve and valve member and normally urging said valve member to a seated position on said third washer, and manually operating means connected to said valve member for displacing the latter from its seated position on said third washer to a seated position on said second washer to jointly unseat said valve.

2. A valve assembly as defined in claim 1 wherein said washers are of identical construction and said spacers are of identical construction whereby any of said washers may be interchanged with each other and any of said spacers may be interchangeably positioned.

3. A valve assembly for a tire inflator mechanism comprising; a body having a cylindrical valve chamber opening to one side thereof and formed with: a passage connected to said chamber adjacent the inner end thereof and adapted for connection to a source of air under pressure, a second passage connected to said chamber outwardly of said first passage and adapted for connection to a tire or the like to be inflated, and a third passage connected to said chamber outwardly of said second passage and adapted for connection to a gauge; a valve washer mounted in said chamber adjacent the inner end thereof between said first and second passages; a supporting disc for said washer mounted outwardly thereof in said chamber; a sleeve member mounted against the outer face of said disc and formed with an annular recess about the outer periphery thereof registering with said second passage and being perforated to permit flow of air from said recess interiorly of said sleeve; a supporting disc mounted against the outer face of said sleeve; a valve washer supported at the outer face of said second disc; a sleeve member abutting the outer face of said second washer and formed with an annular recess about the outer periphery thereof registering with said third passage and being perforated to permit flow of air from the interior thereof to said recess and third passage; a third valve washer abutting the outer end of said second sleeve member; a disc mounted at the outer end of said third washer for supporting same; means retaining said washers and disc members and sleeves in said chamber in the positions aforesaid; said washers being of identical construction and said discs being of identical construction and said sleeves being of identical construction; a valve member reciprocally mounted in the inner end of said chamber for movement to and from the inner face of said first washer; resilient means urging said valve member to said first washer; an actuating stem for said valve member mounted for longitudinal reciprocation centrally through said first and second discs; a double faced valve member monuted for longitudinal reciprocation within the interior of said second sleeve to move into and from engagement with said second and third washers and engageable with the outer end of said stem; and a manual actuating member carried by said first means for longitudinal reciprocation therethrough and engageable at the inner end thereof with said second valve member for displacement thereof to said second washer to displace said first stem and unseat said first valve member.

4. A valve assembly for a tire inflator mechanism comprising, a body having a cylindrical valve chamber opening to one side of the body and formed with an internal shoulder adjacent the inner end thereof, said body being formed with a plurality of passages opening to said chamber at longitudinally spaced points thereof, one of said passages being connected to said chamber inwardly of said shoulder and the other passages being connected to said chamber in successive outwardly spaced positions and said passages being adapted for connection respectively to a source of air under pressure and a valve washer mounted against said shoulder, a second and a third valve washer of identical construction to said first washer mounted in said chamber in successive outwardly spaced positions from said first washer, first and second and third discs of identical construction mounted against and supporting said first and second and third washers in said chamber, a sleeve member mounted between said first and second discs and formed with a peripherally extending recess registering with said second passage and being perforated to permit passage of air between said recess and the interior of said sleeve member, a second sleeve member of identical construction to said first sleeve member mounted between said second and third washers and having a peripherally extending recess registering with said third passage and being perforated to permit passage of air between said recess and the interior of said sleeve member, a plug threaded into said chamber at the open end thereof to hold the aforementioned parts in endwise abutting position in said chamber, a valve member mounted at the inner end of said chamber for reciprocation to and from said first washer, resilient means urging said valve member to seated position on said first washer, a valve member mounted interiorly of said second sleeve member for longitudinal reciprocation to and from said second and third valve washers, manually operated means reciprocally carried by said plug for displacing said second valve member, and means connecting said first and second valve members to displace said first valve member upon displacement of said second valve member.

5. A valve assembly as defined in claim 4 wherein said last named means comprises a stem member mounted for longitudinal reciprocation centrally through said first and second discs and formed with a transversely extending abutment thereon, and a helical spring surrounding said stem member and compressed between said abutment and said first disc whereby said stem member is normally urged against said second valve member to move the latter to a seated position on said third washer.

6. A valve assembly as defined in claim 1 wherein said means connecting said valve and valve member is so constructed as to cause upon movement of said actuating means the unseating of said valve prior to the seating of said valve member against said second washer.

7. A valve assembly as defined in claim 1 wherein said chamber is extended completely through said body to the opposite side thereof, and a plug threaded into the adjacent end of said chamber, said resilient means comprising a helical spring compressed between said plug and said valve.

8. A valve assembly as defined in claim 1 wherein said manually operated means comprises a stem member mounted for longitudinal reciprocation centrally through said closure and said third washer, said closure and third washer being formed with central openings of larger cross-sectional dimension than said stem member to provide clearance for passage of air therebetween for venting said gauge passage in the unseated position of said valve member relative to said third washer.

CARL E. WEHE.